(12) United States Patent
Czerwinka et al.

(10) Patent No.: US 11,970,219 B2
(45) Date of Patent: Apr. 30, 2024

(54) TRIM ASSEMBLY FOR A VEHICLE

(71) Applicant: Siemens Mobility Austria GmbH, Vienna (AT)

(72) Inventors: Thomas Czerwinka, Weitendorf (AT); David Kreuzweger, Lieboch (AT); Alexander Prix, Graz (AT); Jochen Ringswirth, Graz (AT); Christian Moser, Graz (AT)

(73) Assignee: SIEMENS MOBILITY AUSTRIA GMBH, Vienna (AT)

(*) Notice: Subject to any disclaimer, the term of this patent is extended or adjusted under 35 U.S.C. 154(b) by 921 days.

(21) Appl. No.: 16/971,380

(22) PCT Filed: Feb. 21, 2018

(86) PCT No.: PCT/EP2018/054201
§ 371 (c)(1),
(2) Date: Aug. 20, 2020

(87) PCT Pub. No.: WO2019/161888
PCT Pub. Date: Aug. 29, 2019

(65) Prior Publication Data
US 2021/0024145 A1    Jan. 28, 2021

(51) Int. Cl.
*B62D 35/02* (2006.01)
*B61D 17/02* (2006.01)
(Continued)

(52) U.S. Cl.
CPC ............ *B62D 35/02* (2013.01); *B61D 17/02* (2013.01); *B61F 3/04* (2013.01); *B61F 3/14* (2013.01); *B60G 2204/4308* (2013.01)

(58) Field of Classification Search
CPC ...... B62D 35/02; B62D 37/02; B61D 17/005; B61D 17/02; B61F 3/00; B61F 3/02; B61F 3/04; B61F 3/14; B60G 2204/4308
See application file for complete search history.

(56) References Cited

U.S. PATENT DOCUMENTS 4,386,801 A    6/1983  Chapman et al.
9,650,077 B2 *  5/2017  Lim ..................... B60R 21/34
(Continued)

FOREIGN PATENT DOCUMENTS

DE    102006041163       3/2008
DE    102006041163 A1 *  3/2008  ......... B62D 25/2072
(Continued)

OTHER PUBLICATIONS

PCT International Search Report dated Nov. 27, 2018 based on PCT/EP2018/054201 filed Feb. 21, 2018.

*Primary Examiner* — S. Joseph Morano
*Assistant Examiner* — Cheng Lin
(74) *Attorney, Agent, or Firm* — Cozen O'Connor

(57) ABSTRACT

A trim assembly having at least a first trim part for a vehicle, wherein the trim assembly is connected to an undercarriage of the vehicle via a bearing device, and wherein in order to create advantageous design conditions, the bearing device includes at least a first bearing, a second bearing and a third bearing, which are each connected to at least one component coupled to a first wheelset or a first wheelset bearing system of the undercarriage, the at least first trim part is mounted in an articulated manner with respect to a first bearing transverse axis of the undercarriage via the at least first bearing, and the at least first trim part is mounted with mechanical decoupling with respect to directions of motion parallel to an undercarriage longitudinal plane via the second bearing and the third hearing such that mechanical loads acting on the trim assembly are thereby reduced.

11 Claims, 3 Drawing Sheets

(51) Int. Cl.
*B61F 3/04* (2006.01)
*B61F 3/14* (2006.01)

(56) References Cited

U.S. PATENT DOCUMENTS

| | | | | |
|---|---|---|---|---|
| 9,902,439 B2 * | 2/2018 | Fahland | ................. | B62D 35/02 |
| 9,908,538 B2 * | 3/2018 | Kreuzweger | .......... | B61D 17/02 |
| 9,994,240 B2 * | 6/2018 | Haigermoser | .......... | B61C 17/00 |
| 2016/0339972 A1 * | 11/2016 | Beckon | ................. | B62D 37/02 |

FOREIGN PATENT DOCUMENTS

| | | | |
|---|---|---|---|
| DE | 102009006562 | 8/2010 | |
| DE | 102012214606 | 3/2014 | |
| DE | 102012214606 A1 * | 3/2014 | ......... B60R 13/0861 |
| DE | 102015011518 | 3/2017 | |
| DE | 102015011518 A1 * | 3/2017 | ......... B60R 13/0861 |
| DE | 102016125704 | 7/2017 | |
| EP | 0030122 | 6/1981 | |
| FR | 2961468 | 12/2011 | |
| FR | 2961468 A1 * | 12/2011 | ............. B62D 35/02 |
| JP | 2012240651 | 12/2012 | |
| WO | 2014/135416 | 9/2014 | |
| WO | 2014/206643 | 12/2014 | |

* cited by examiner

TRIM ASSEMBLY FOR A VEHICLE

CROSS-REFERENCE TO RELATED APPLICATION

This is a U.S. national stage of application No. PCT/EP2018/054201 filed 21 Feb. 2018.

BACKGROUND OF THE INVENTION

1. Field of the Invention

The invention relates to a trim assembly having at least one first trim part for a vehicle, where the trim assembly is connected to an undercarriage of the vehicle via a bearing device.

2. Description of the Related Art

To achieve a low drag air resistance, vehicles, undercarriages and/or roofs and roof structures of vehicles (e.g., rail vehicles, and/or bogies and roofs of rail vehicles) frequently have aerodynamically shaped trims. In the case of high vehicle speeds, a low drag air resistance is particularly important to minimize the energy requirement or the requirement for drive power and/or fuel consumption of the vehicle.

WO 2014/206643 A1, for example, describes a concealed undercarriage for a rail vehicle. Side parts of the trim are arranged on the sides of the undercarriage or along the rail vehicle. A bottom part is provided on an underside of the undercarriage. The side parts are connected to a body of the rail vehicle, and the bottom part to the undercarriage. A gap is provided between the side elements and the bottom element, which consequently enables turning of the wheels.

DE 10 2009 006 562 A1 discloses a trim for an undercarriage of a rail vehicle or a rail vehicle with a concealed undercarriage is disclosed. The trim comprises a wall enclosing the undercarriage and an underbody. The underbody is connected to the undercarriage via a fastening device.

The disadvantage of the conventional approaches in their known form is that the disclosed trims are subject to strong mechanical loads.

SUMMARY OF THE INVENTION

In view of the foregoing, it is therefore an object of the invention to provide a trim assembly that is further developed compared to the prior art and that is subject to a tolerable load with respect to mechanical properties.

This and other objects and advantages are are achieved in accordance with the invention by a trim assembly in which a bearing device has at least a first bearing, a second bearing and a third bearing, which are each connected to at least one component coupled to a first wheelset or a first wheelset bearing system of the undercarriage, where the at least first trim part is mounted in an articulated manner with respect to a first bearing transverse axis of the undercarriage via the at least first bearing, and where the at least first trim part is mounted with mechanical decoupling with respect to directions of motion parallel to an undercarriage longitudinal plane via the second bearing and the third bearing.

A statically overdefined mounting of the trim assembly on the undercarriage is consequently prevented and mechanical loads acting on the trim assembly in the region of the first bearing, the second bearing and the third bearing are reduced, along with stresses on the trim assembly. The trim assembly can thus be embodied as compact or thin-walled and inexpensive.

The trim is suspended on components of the undercarriage that are only weakly sprung, if at all. As a result, the trim assembly moves along with these components. The trim assembly does not therefore cause any motion restrictions for these components and/or, in order to ensure a corresponding freedom of motion of these components, no additional installation space between the trim assembly and these components need be provided.

It is advantageous if the at least first bearing has at least one first clamp, via which the at least first trim part is connected to a first roll stabilizer of the undercarriage.

The first clamp can, for example, be formed as hook-shaped and be mounted in a torsion bar of the first roll stabilizer. Owing to this measure, the first roll stabilizer acts as a part of the first bearing, as a result of which no specific devices for the suspension of the trim assembly need be provided on the undercarriage. The undercarriage can thereby be simply configured despite the trim assembly connected thereto.

In an advantageous embodiment, the second bearing and the third bearing are formed as wire cable dampers. Owing to this measure, a strong and directional damping effect or an effective absorption of impacts is achieved between the trim assembly and the undercarriage.

In an advantageous embodiment, the at least first trim part exclusively has reinforcing ribs which run approximately in the direction of a trim longitudinal axis. An advantageous reinforcement of the first trim part in the direction of the trim longitudinal axis is consequently achieved, on the one hand, and a high resilience of the first trim part in particular in the case of bending loads about the trim longitudinal axis, on the other hand.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below on the basis of exemplary embodiments, in which.

DETAILED DESCRIPTION OF THE EXEMPLARY EMBODIMENTS

Figure 1:
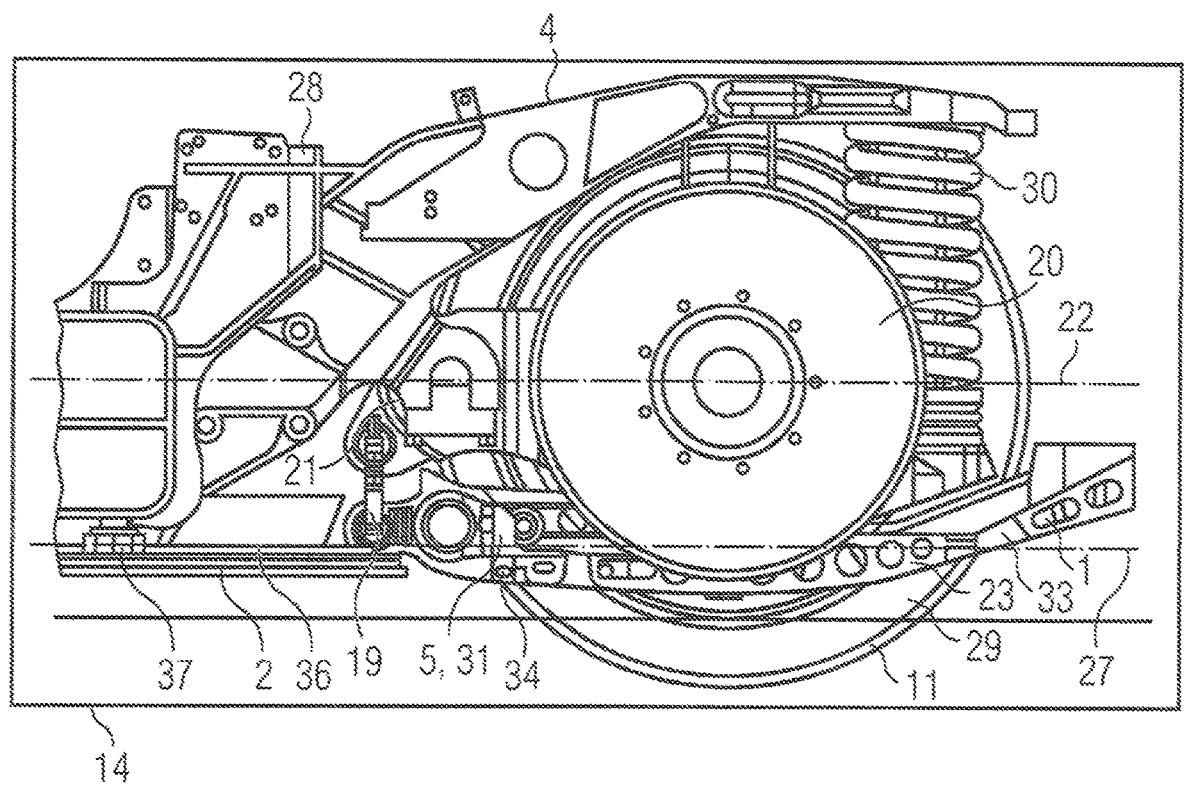
FIG. 1 shows a side view of a section of an undercarriage of a rail vehicle with a first exemplary embodiment of a trim assembly having a first bearing in accordance with the invention.

A section, illustrated in FIG. 1 in a side view, of an internally mounted undercarriage 4 of a rail vehicle, has an undercarriage frame 28 and a first wheelset 11 with a first wheel 29 and a second wheel (not visible in FIG. 1). A first wheelset bearing device with a first wheelset bearing housing 21 and a second wheelset bearing device (not visible in FIG. 1) with a second wheelset bearing housing as well as a first primary spring 30 and a non-visible second primary spring are provided between the undercarriage frame 28 and the first wheelset 11. The first wheelset bearing device and the second wheelset bearing device form a first wheelset bearing system of the first wheelset 11.

A first drive unit 20 is connected to the first wheelset 11. The undercarriage 4 has a second wheelset (not shown) that is formed identically to the first wheelset 11 with respect to its configuration and functional properties.

The second wheelset is coupled to the undercarriage frame 28 via a third wheelset bearing device and a fourth wheelset bearing device as well as a third primary spring and a fourth primary spring, which are likewise not illustrated. A second drive unit (not shown) is connected to the second wheelset.

Figure 2:
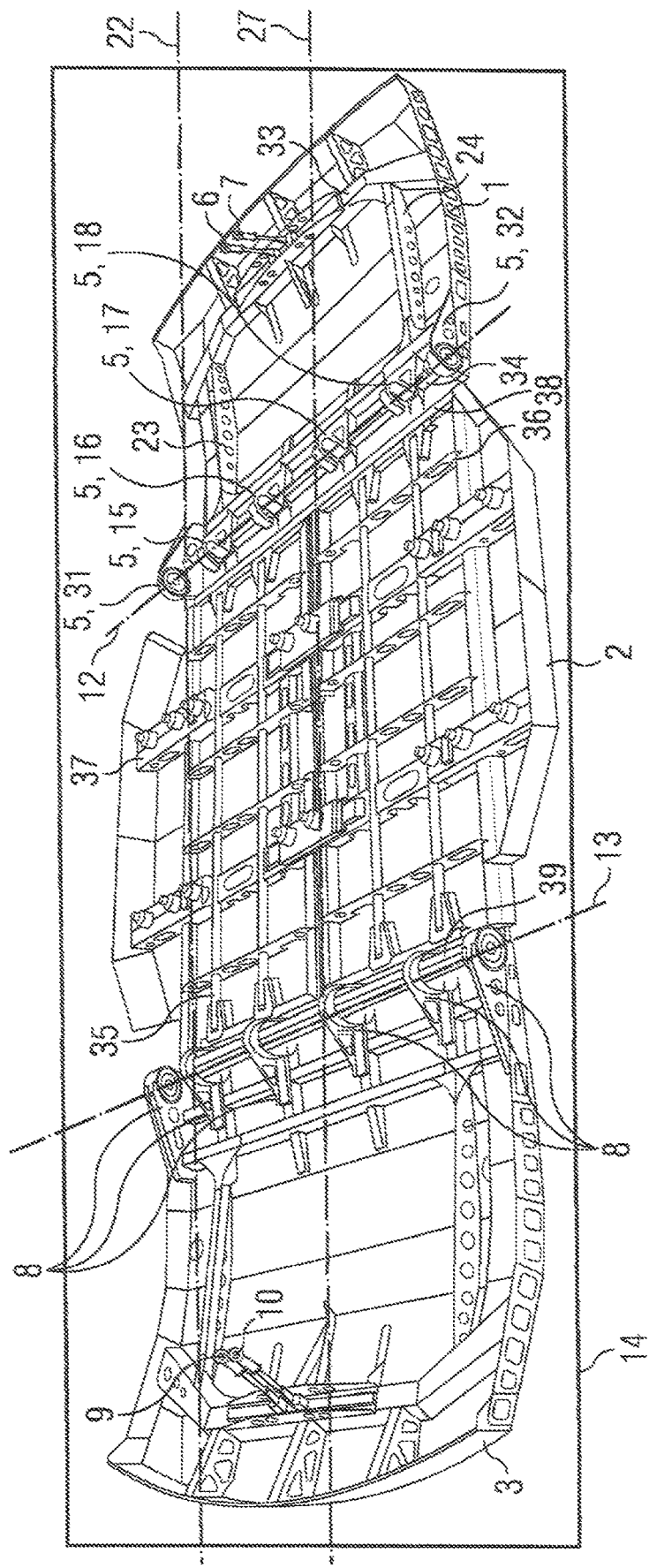
FIG. 2 shows an oblique projection of the first exemplary embodiment a three-part trim assembly having a second bearing, a third bearing and further bearings that are formed as traction-pressure rods in accordance with the invention.

A first exemplary embodiment of an inventive, three-part trim assembly having a first trim part 1, a second trim part 2 and a third trim part 3 shown in FIG. 2 is connected to the undercarriage 4 via a bearing device. The trim assembly is aerodynamically shaped and is arranged on an underside of the undercarriage 4, approximately parallel to an undercarriage longitudinal axis 22 running in an undercarriage longitudinal plane 14.

The first trim part 1 is formed curved upward on the side facing away from the second trim part 2. The first trim part 1 is connected to a first roll stabilizer 19 via a first bearing 5 of the first trim part 1, which has a first guide bracket 31 welded in the region of a transverse bar 34 to a first longitudinal reinforcing rib 23, a second guide bracket 32 visible in FIG. 2 and, likewise shown in FIG. 2, a first clamp 15, a second clamp 16, a third clamp 17 and a fourth clamp 18. A torsion bar of the first roll stabilizer 19 extending along a first bearing transverse axis 12 of the undercarriage 4 illustrated in FIG. 2 is guided through the first guide bracket 31, the second guide bracket 32 and the first clamp 15, the second clamp 16, the third clamp 17 and the fourth clamp 18. The first clamp 15, the second clamp 16, the third clamp 17 and the fourth clamp 18 are mounted in the torsion bar. Accordingly, the first trim part 1 is mounted in an articulated or rotatable manner with respect to the first bearing transverse axis 12.

The first roll stabilizer 19 is connected to the torsion bar via a first lever and a second lever. The first lever is connected to a third lever, the second lever to a fourth lever. The third lever is connected to the first wheelset bearing housing 21, the fourth lever to the second wheelset bearing housing. Accordingly, the first trim part 1 is connected via the first bearing 5 to a component coupled to the first wheelset bearing system of the undercarriage 4.

In accordance with the invention, it is also conceivable for the first trim part 1 to be connected by the first bearing 5 via the first guide bracket 31 directly in an articulated manner to the first wheelset bearing housing 21 and via the second guide bracket 32 directly in an articulated manner to the second wheelset bearing housing. The first clamp 15, the second clamp 16, the third clamp 17 and the fourth clamp 18 can be dispensed with for this alternative embodiment variant.

Furthermore, it is possible to arrange a first force transmission element (e.g., a first rod or a first bar) between the first guide bracket 31 and the first wheelset bearing housing 21 and a second force transmission element (e.g., a second rod or a second bar) between the second guide bracket 32 and the second wheelset bearing housing.

The first trim part 1 is connected to the first drive unit 20, i.e., to a component or a wheelset component mounted on the first wheelset 11, via a second bearing 6 formed as a first traction-pressure rod and a third bearing 7 embodied as a second traction-pressure rod, which are visible in FIG. 2. The first traction-pressure rod and the second traction-pressure rod are connected in an articulated manner to a support 33 of the first trim part 1, on the one hand, and in an articulated manner to the first drive unit 20, on the other hand. The first trim part 1 is thus mounted mechanically decoupled with respect to directions of motion parallel to the undercarriage longitudinal plane 14.

The first trim part 1 is connected to the second trim part 2 in an articulated manner, i.e., rotatably about an axis parallel to the first bearing transverse axis 12, via a first hinge 38 visible in FIG. 2. The second trim part 2 has a first safety catch 37 and further safety catches that are visible in FIG. 2.

The third trim part 3 is formed identically to the first trim part 1 with respect to its configuration properties and its connection to the undercarriage 4 and to the second trim part 2. The third trim part 3 has, for its connection to the undercarriage 4, a fourth bearing 8, a fifth bearing 9 and a sixth bearing 10, which are illustrated in FIG. 2, and, for its coupling to the second trim part 2, a second hinge 39, which is likewise shown in FIG. 2.

The first bearing 5, the second bearing 6, the third bearing 7, the fourth bearing 8, the fifth bearing 9 and the sixth bearing 10 form the bearing device of the inventive trim assembly.

If the bearing device fails or if it is removed during a disassembly procedure of the trim assembly, then the trim assembly hangs on the undercarriage frame 28 via safety bolts of the first safety catch 37 and of the further safety catches. The trim assembly is thus prevented from falling down. Furthermore, stops (not illustrated) formed as rubber buffers between the second trim part 2, on the one hand, and the first trim part 1 and the third trim part 3, on the other hand, mean that the first trim part 1 and the third trim part 3 can only swing downward by a defined angle if the bearing device is removed. Thus, unintentional contacts between the trim assembly and a track or a track bed, etc. are prevented.

FIG. 2 shows the embodiment of an inventive trim assembly, which is also illustrated in FIG. 1, as an oblique projection.

The presently illustrated embodiment can be used in particular for the trim on traction bogies, i.e., on driven undercarriages.

The trim assembly is formed in three-parts and has a first trim part 1, a second trim part 2 and a third trim part 3. The second trim part 2 is coupled via a first hinge 38 in an articulated manner to the first trim part 1 and is coupled via a second hinge 39 in an articulated manner to the third trim part 3.

The trim assembly is manufactured from steel and aluminum sheets. In accordance with disclosed embodiments of the invention, it is however also conceivable for the trim assembly to be formed from composite materials or as a laminate.

The first trim part 1 is connected via a first bearing 5 to a first roll stabilizer 19 (not shown in FIG. 2) of an undercarriage 4, of which in FIG. 2 only an undercarriage longitudinal axis 22 extending in an undercarriage longitudinal plane 14 is shown. In turn, the first roll stabilizer 19 is coupled to a first wheelset bearing housing 21 and a second wheelset bearing housing, which are associated with a first wheelset bearing system of the undercarriage 4. The first bearing 5 has a perforated first guide bracket 31 and a perforated second guide bracket 32 as well as a first clamp 15, a second clamp 16, a third clamp 17 and a fourth clamp 18. The first clamp 15 is welded to a first longitudinal reinforcing rib 23, the fourth clamp 18 is welded to a second longitudinal reinforcing rib 24 of the first trim part 1. The second clamp 16 and the third clamp 17 are welded directly to the first trim part 1, since no longitudinal reinforcing ribs run in the region thereof.

A transverse bar 34 welded to the first trim part 1 extends directly under the first clamp 15, the second clamp 16, the third clamp 17 and the fourth clamp 18.

A torsion bar of the first roll stabilizer 19 oriented along a first bearing transverse axis 12 is guided through the first guide bracket 31 and the second guide bracket 32. The first clamp 15, the second clamp 16, the third clamp 17 and the fourth clamp 18 are formed in hook-shapes and are mounted in the torsion bar. Thus, the first trim part 1 is rotatably coupled to the undercarriage 4 or to a component of the undercarriage 4 connected to the first wheelset bearing system via the first bearing 5.

The trim assembly has a second bearing 6 formed as a first traction-pressure rod and a third bearing 7 formed as a second traction-pressure rod. The first traction-pressure rod and the second traction-pressure rod are coupled on their undersides in an articulated manner about an axis parallel to the first bearing transverse axis 12 on a support 33 welded to the first trim part 1 and on their upper sides are likewise connected in an articulated manner about an axis parallel to the first bearing transverse axis 12 to adapters (not illustrated) which are welded to a first drive unit 20 shown in FIG. 1, which is coupled to a first wheelset 11 likewise illustrated in FIG. 1. The first trim part 1 is thus mounted with mechanical decoupling in directions of motion parallel to the undercarriage longitudinal plane 14 via the second bearing 6 and the third bearing 7.

The first longitudinal reinforcing rib 23 and the second longitudinal reinforcing rib 24 are oriented approximately parallel to a trim longitudinal axis 27. Installation space for the first drive unit 20 is provided between the first longitudinal reinforcing rib 23 and the second longitudinal reinforcing rib 24. As a result of the first longitudinal reinforcing rib 23 and the second longitudinal reinforcing rib 24, the first trim part 1 has a high resilience against bends about axes parallel to the first bearing transverse axis 12 and is nevertheless torsionally flexible with respect to bends about axes parallel to the trim longitudinal axis 27.

The second trim part 2 has a first safety catch 37 and further safety catches with safety bolts projecting into an undercarriage frame 28, shown in FIG. 1, of the undercarriage 4. The first safety catch 37 and the further safety catches are described in conjunction with FIG. 1 with respect to their functional properties.

To improve its mechanical properties the second trim part 2 has a first longitudinal reinforcing bar 35 and further longitudinal reinforcing bars as well as a first transverse reinforcing rib 36 and further transverse reinforcing ribs.

The third trim part 3 is formed as identical to the first trim part 1 with respect to its design and functional properties. The third trim part 3 has a fourth bearing 8, via which it is connected rotatably with respect to a second bearing transverse axis 13 of a second roll stabilizer (not shown) of a second wheelset bearing system of the undercarriage 4.

Furthermore, a fifth bearing 9 embodied as a third traction-pressure rod and a sixth bearing 10 formed as a fourth traction-pressure rod are provided, via which the third trim part 3 is connected in an articulated manner to a second drive unit (not illustrated) of the undercarriage 4.

Figure 3:
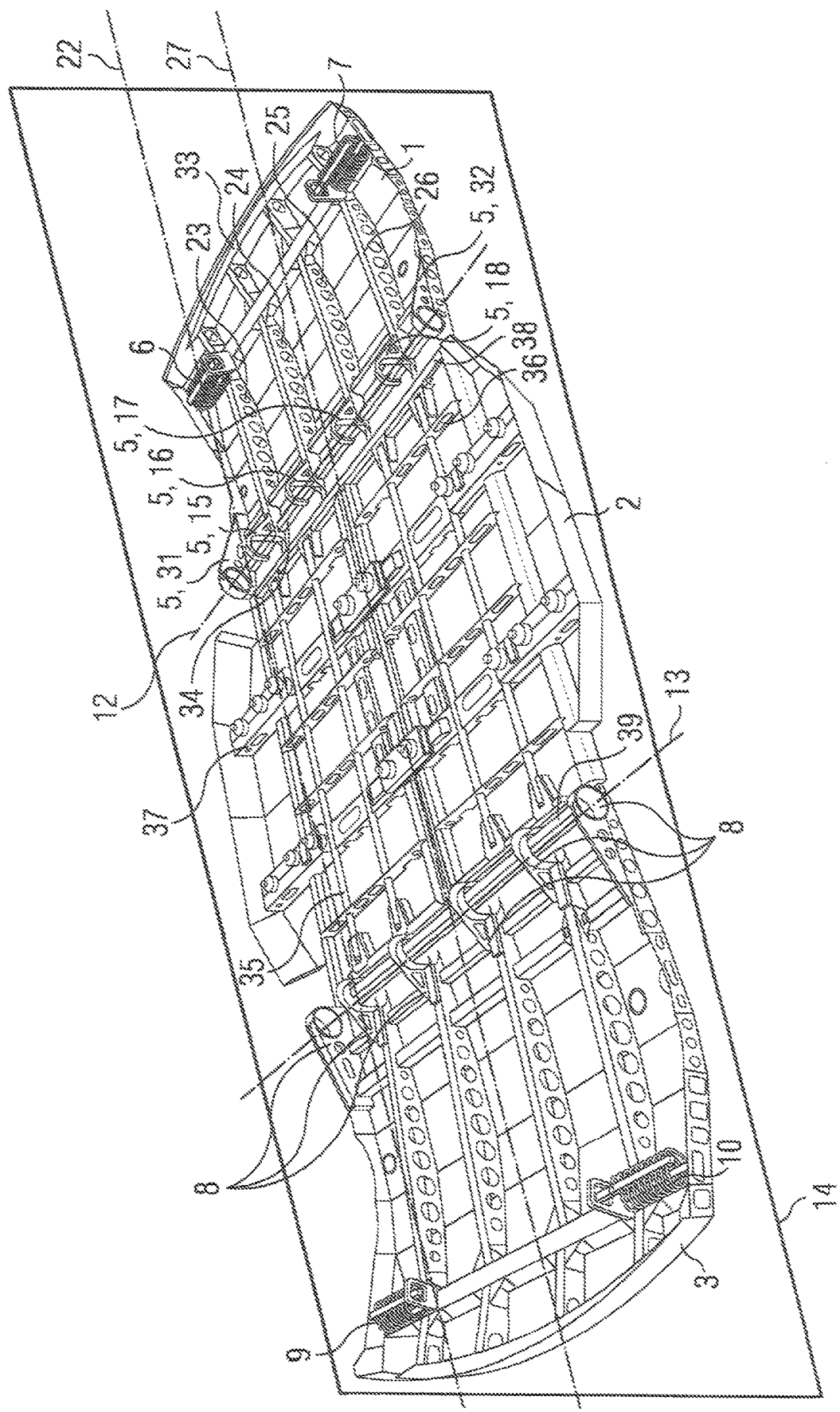
FIG. 3 shows an oblique projection of second exemplary embodiment of a three-part trim assembly having a second bearing, a third bearing and further bearings that are formed as wire cable dampers in accordance with the invention.

FIG. 3 shows an exemplary second embodiment of an inventive trim assembly which, with respect to its configuration and functional properties, is formed similarly to the embodiment illustrated in FIG. 1 and FIG. 2. Hence, in FIG. 3 the identical reference characters are in part used as in FIG. 1 and FIG. 2.

This second embodiment can in particular be used for the trim of center bogies, i.e., of driveless undercarriages. In contrast to FIG. 1 and FIG. 2, the trim assembly illustrated in FIG. 3 has a second bearing 6 and a third bearing 7 on a first trim part 1 as well as a fifth bearing 9 and a sixth bearing 10 on a third trim part 3, which are formed as wire cable dampers. These wire cable dampers have windings and mounting beams on their undersides and upper sides. The wire cable dampers are bolted to the trim assembly via the mounting beams on the undersides.

Longitudinal axes of these wire cable dampers extend parallel to a first bearing transverse axis 12 or a second bearing transverse axis 13. The wire cable dampers are bolted via the mounting beams on their upper sides to a first wheelset bearing system or to a second wheelset bearing system of a center bogie of a rail vehicle, of which in FIG. 3 only an undercarriage longitudinal axis 22 running in an undercarriage longitudinal plane 14 is illustrated. The second bearing 6 is connected to a first wheelset bearing housing 21, the third bearing 7 to a second wheelset bearing housing, the fifth bearing 9 to a third wheelset bearing housing and the sixth bearing 10 to a fourth wheelset bearing housing.

In accordance with the disclosed embodiments of the invention, welded connections are also conceivable between the wire cable dampers and the trim assembly or the first wheelset bearing system and the second wheelset bearing system.

The wire cable dampers cause a certain mobility of the trim assembly and vibration damping in all three spatial directions.

The wire cable dampers are formed stiffer in the direction of their longitudinal axes (i.e., in the direction of their winding runs) than orthogonally to the longitudinal axes, as a result of which the mobility of the trim assembly in directions parallel to the undercarriage longitudinal plane 14 is greater than orthogonally to the undercarriage longitudinal plane 14.

Furthermore a first longitudinal reinforcing rib 23, a second longitudinal reinforcing rib 24, a third longitudinal reinforcing rib 25 and a fourth longitudinal reinforcing rib 26 are welded to the first trim part 1, and are oriented approximately parallel to a trim longitudinal axis 27. Further longitudinal reinforcing ribs are connected to the third trim part 3, and likewise run approximately parallel to the trim longitudinal axis 27.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A trim assembly comprising:
   at least one first trim part for a vehicle; and
   a bearing device via which said trim assembly is connected to an undercarriage of the vehicle;
   wherein the bearing device includes at least a first bearing, a second bearing and a third bearing, which are each connected to at least one component coupled to one of (i) a first wheelset and (ii) a first wheelset bearing system of the undercarriage;
   wherein the at least one first trim part is mounted at an outer end along a longitudinal plane of an undercarriage in an articulated manner with respect to a first bearing transverse axis of the undercarriage via the at least first bearing; and
   wherein the at least first trim part is mounted with mechanical decoupling with respect to directions of motion parallel to an undercarriage longitudinal plane via the second bearing and third bearings.

2. The trim assembly as claimed in claim 1, wherein the at least first bearing includes at least one first clamp via which the at least first trim part is connected to a first roll stabilizer of the undercarriage.

3. The trim assembly as claimed in claim 2, wherein the second and third bearings are formed as traction-pressure rods.

4. The trim assembly as claimed in claim 2, wherein the second and third bearings are formed as wire cable dampers.

5. The trim assembly as claimed in claim 1, wherein the second and the third bearings are formed as traction-pressure rods.

6. The trim assembly as claimed in claim 1, wherein the second and third bearings are formed as wire cable dampers.

7. The trim assembly as claimed in claim 1, wherein the second and third bearings are connected to a first drive unit of the undercarriage.

8. The trim assembly as claimed in claim 1, wherein the second bearing is connected to a first wheelset bearing housing of the undercarriage and the third bearing is connected to a second wheelset bearing housing of the undercarriage.

9. The trim assembly as claimed in claim 1, wherein the at least one first trim part is mounted with mechanical decoupling in a direction of an undercarriage longitudinal axis via the second and third bearings.

10. The trim assembly as claimed in claim 1, wherein only the at least one first trim part has reinforcing ribs which extend approximately in a direction of a trim longitudinal axis.

11. An internally mounted undercarriage having the trim assembly as claimed in claim 1.

* * * * *